(12) United States Patent
Lee et al.

(10) Patent No.: US 6,714,972 B1
(45) Date of Patent: Mar. 30, 2004

(54) METHOD AND APPARATUS FOR CONFIGURING NETWORK DEVICES WITH SUBNETWORKS IN AN ATM ENVIRONMENT AND RETRIEVING PERMANENT VIRTUAL CHANNEL (PVC) CONFIGURATION INFORMATION FROM NETWORK DEVICES

(75) Inventors: Gabriel Lee, El Cerrito, CA (US); David Langley, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/010,811

(22) Filed: Nov. 13, 2001

Related U.S. Application Data

(62) Division of application No. 08/996,118, filed on Dec. 22, 1997.

(51) Int. Cl.[7] .................. G06F 15/177; H04L 12/28
(52) U.S. Cl. .................. 709/220; 709/223; 709/224; 370/395; 370/397; 370/399
(58) Field of Search ................. 709/223, 224, 709/218, 202, 220; 370/395, 399, 397

(56) References Cited

U.S. PATENT DOCUMENTS

| | | | |
|---|---|---|---|
| 5,185,860 A | | 2/1993 | Wu |
| 5,271,010 A | | 12/1993 | Miyake et al. |
| 5,339,318 A | * | 8/1994 | Tanaka et al. .............. 370/399 |
| 5,367,635 A | | 11/1994 | Bauer et al. |
| 5,408,469 A | * | 4/1995 | Opher et al. ................ 370/399 |
| 5,422,838 A | | 6/1995 | Lin |
| 5,469,543 A | | 11/1995 | Nishihara et al. |
| 5,509,123 A | | 4/1996 | Dobbins et al. |
| 5,513,172 A | | 4/1996 | Shikama et al. |
| 5,539,884 A | | 7/1996 | Robrock, II |
| 5,541,922 A | | 7/1996 | Pyhälammi |
| 5,555,256 A | | 9/1996 | Calamvokis |
| 5,561,769 A | | 10/1996 | Kumar et al. |
| 5,583,863 A | | 12/1996 | Darr, Jr. et al. |
| 5,586,255 A | * | 12/1996 | Tanaka et al. .............. 709/223 |
| 5,734,654 A | | 3/1998 | Shirai et al. |
| 5,751,698 A | | 5/1998 | Cushman et al. |
| 5,757,796 A | | 5/1998 | Hebb |
| 5,796,736 A | * | 8/1998 | Suzuki ...................... 370/254 |
| 5,802,146 A | | 9/1998 | Dulman |
| 5,802,287 A | | 9/1998 | Rostoker et al. |

(List continued on next page.)

OTHER PUBLICATIONS

Microsoft Press, "Microsoft Press Computer Dictionary", Third Edition, 1997, pp. 103, 253, 252, 288.

M. Ahmed, et al., "Definitions of Managed Objects for ATM Management Version 8.0 using SMIv2," Aug. 1994, pp. 1–68.

*Primary Examiner*—Marc D. Thompson
*Assistant Examiner*—Beatriz Prieto
(74) *Attorney, Agent, or Firm*—Hickman Palermo Truong & Becker LLP (57) ABSTRACT

A method and apparatus retrieves and stores configuration information for network endpoint devices from other devices in the network, such as a switch adjacent to the endpoint device. When the endpoint device establishes a connection with the network, it generates a sequence of SNMP getnext commands using the ILMI interface to obtain the configuration information from the network device. If the network device sends a trap to the endpoint device indicating a change has been made to the configuration parameters stored in the network device for a PVC, a series of SNMP getrequest commands are made using the ILMI interface to retrieve the configuration information for that PVC from the network device. If the endpoint device detects an interruption in communication with the network device, the endpoint device discards the information retrieved previously.

5 Claims, 6 Drawing Sheets

U.S. PATENT DOCUMENTS

| | | | |
|---|---|---|---|
| 5,802,306 A | * 9/1998 | Hunt | 709/228 |
| 5,805,592 A | 9/1998 | Hatano | |
| 5,815,737 A | 9/1998 | Buckland | |
| 5,835,710 A | 11/1998 | Nagami et al. | |
| 5,836,008 A | 11/1998 | Goumillou | |
| 5,841,874 A | 11/1998 | Kempke et al. | |
| 5,864,555 A | 1/1999 | Mathur et al. | |
| 5,887,187 A | 3/1999 | Rostoker et al. | |
| 5,898,689 A | 4/1999 | Kumar et al. | |
| 5,905,728 A | * 5/1999 | Han et al. | 370/395.3 |
| 5,913,037 A | * 6/1999 | Spofford et al. | 709/226 |
| 5,925,111 A | 7/1999 | Nagasawa | |
| 5,926,463 A | 7/1999 | Ahearn et al. | |
| 5,928,325 A | 7/1999 | Shaughnessy et al. | |
| 5,960,176 A | 9/1999 | Kuroki et al. | |
| 5,982,783 A | * 11/1999 | Frey et al. | 370/395.6 |
| 5,987,516 A | 11/1999 | Rao et al. | |
| 5,991,806 A | 11/1999 | McHann, Jr. | |
| 6,026,467 A | 2/2000 | Petty | |
| 6,028,863 A | 2/2000 | Sasagawa et al. | |
| 6,034,958 A | 3/2000 | Wicklund | |
| 6,044,077 A | 3/2000 | Luijten et al. | |
| 6,076,107 A | 6/2000 | Chen et al. | |
| 6,111,880 A | 8/2000 | Rusu et al. | |
| 6,175,567 B1 | 1/2001 | Yoo | |

* cited by examiner

| ITEM | 0 | VPI | VCI | VALUE |
|---|---|---|---|---|
| 1 | 0 | 0 | 35 | 40 |
| 1 | 0 | 10 | 100 | 50 |
| 2 | 0 | 0 | 35 | 30 |
| 2 | 0 | 10 | 100 | 40 |
| 22 | 0 | 10 | 100 | 50 |

ATMFVCCENTRY

METHOD AND APPARATUS FOR CONFIGURING NETWORK DEVICES WITH SUBNETWORKS IN AN ATM ENVIRONMENT AND RETRIEVING PERMANENT VIRTUAL CHANNEL (PVC) CONFIGURATION INFORMATION FROM NETWORK DEVICES

RELATED APPLICATIONS

This application is a divisional of application Ser. No. 08/996,118 entitled, "METHOD AND APPARATUS FOR CONFIGURING NETWORK DEVICES WITH SUBNETWORKS" filed on Dec. 22, 1997 by David Langley and Gabrial Lee and having the same assignee as this application, and that application is incorporated herein by reference in its entirety.

The subject matter of this application is related to the subject matter of application Ser. No. 08/996,117 entitled, "METHOD AND APPARATUS FOR CONFIGURING NETWORK DEVICES" filed on Dec. 22, 1997 by Gabrial Lee and David Langley and having the same assignee as this application and is incorporated herein by reference in its entirety.

FIELD OF THE INVENTION

The present invention is related to Asynchronous Transfer Mode (ATM) network software, and more specifically to software configuration of Asynchronous Transfer Mode (ATM) network devices.

BACKGROUND OF THE INVENTION

Communication networks using Asynchronous Transfer Mode technology are known as ATM networks. ATM networks may be used to communicate different types of information to and from many types of devices. The types of information communicated using ATM networks can include computer data, as well as digitized voice or video.

Figure 1A:
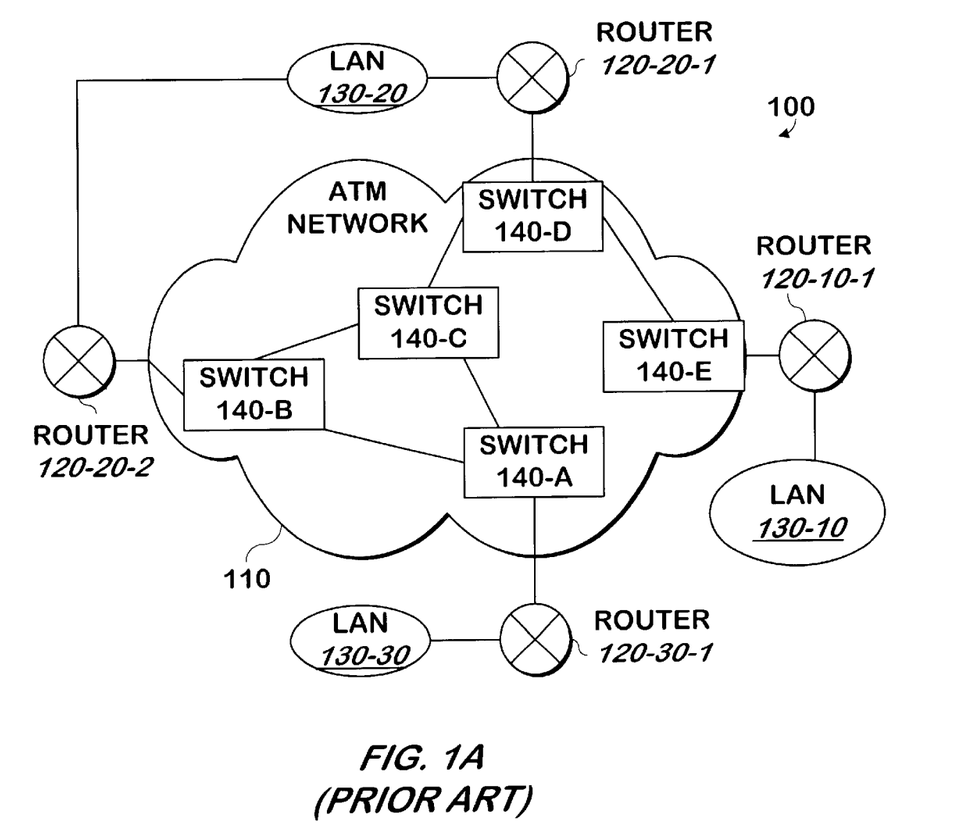
FIG. 1A is a block schematic diagram of a conventional ATM network connected via routers to three conventional local area networks.

Referring now to FIG. 1, a computer network 100 using an ATM network 110 is shown. A set of ATM switches 140A, 140B, 140C, 140D, 140E allows communication between any device, such as a computer coupled to local area networks 130-10, 130-20, 130-30. Each local area network 130-10, 130-20, 130-30 is connected to the set of ATM switches 140A, 140B, 140C, 140D, 140E via one or more routers 120-10-1, 120-20-1, 120-20-2, 120-30-1.

Each source of information into the network 110 and recipient of information from the network 110 is known as an endpoint device 120-10-1, 120-20-1, 120-20-2, 120-30-1. In FIG. 1A, the endpoint devices 120-10-1, 120-20-1, 120-20-120-30-1 are routers, although other devices, such as a computer with an ATM network interface card, can serve as an endpoint device. Any device that serves as a source or destination of data to or from the ATM network is an endpoint device.

Communication using the ATM network 110 between any two endpoint devices 120-10-1, 120-20-1, 120-20-2, 120-30-1 is accomplished through the use of virtual circuits. A virtual circuit is a path through the network 110 from one endpoint device 120-10-1, 120-20-1, 120-20-2, 120-30-1 to one or more endpoint devices 120-10-1, 120-20-1, 120-20-2, 120-30-1. ATM networks 110 use two types of virtual circuits, switched and permanent.

A switched virtual circuit is maintained only for a short duration, like the connection between two conventional telephone users is only maintained for the duration of a conventional telephone call. In contrast, once a permanent virtual circuit is maintained, it is available any time, like a leased telephone line. Switched virtual circuits are arranged in advance of use by a signal from the originating endpoint device 120-10-1, 120-20-1, -120-20-2, 120-30-1, however permanent virtual circuits (known as "PVCs") are arranged by the network manager that manages the network 110.

To allow a connection between endpoint devices 120-101-120-20-1, 120-20-2, 120-30-1, each of the switches 140A, 140C, 140D, 140E that will make up a PVC must be configured with two sets of information. The first set of information describes where to forward any information marked as intended for the PVC. The second set of information describes how the information is expected to be transmitted over the PVC.

The endpoint devices that will use the PVC 120-30-1, 120-10-1 must also be configured, a tedious, time consuming and error-prone process. For some systems, the configuration of the endpoint devices that will use the PVC 120-30-1, 120-10-1 is performed by a person different from the network manager. Some of the configuration information in the endpoint devices 120-30-1, 120-10-1 that will use the PVC corresponds to some of the configuration information in some or all of the switches 140A, 140C, 140D and 140E that will carry the information through the ATM network 110.

The configuration information configured for each PVC in some or all of the switches 140A, 140C, 140D and 140E must match the corresponding configuration information in the endpoint devices 120-30-1, 120-10-1 that will communicate using that PVC. If the network 110 is configured, but the endpoints 120-30-1, 120-10-1 are not, (or vice versa) communication using the PVC may be unreliable or impossible. Once both the network 110 and the endpoints 120-30-1, 120-10-1 are configured, if the corresponding configuration information in each does not match, communication will be unreliable or impossible. Thus, errors made by the person who configures the endpoint devices can prevent proper communication using the PVC. Because the person who configures the endpoint device may be different from the person who configures the switches, configuration mismatches are more likely to occur.

If the network manager changes the configuration information in the devices used for the PVC in the ATM network 110, the end point devices 120-30-1, 120-10-1 that use the PVC must also be changed, a tedious, time consuming and error-prone process. Mistakes that are made in the configuration process may make communication using the PVC impossible or unreliable. In addition, during the period between when the devices in the ATM network 110 are reconfigured, and the time the endpoint devices 120-30-1, 120-10-1 are reconfigured, communication using the network 110 may be interrupted.

In some endpoint devices 120-10-1, 120-20-1, 120-20-2, 120-30-1, the manager of the endpoint device 120-10-1, 120-20-1, 120-20-2, 120-30-1 can logically divide a physical interface of the endpoint device 120-10-1, 120-20-1, 120-20-2, 120-30-1 into a main interface and multiple logical interfaces known as subinterfaces. This division can be desirable for endpoint devices supporting Internet Protocol. For example, router 120-30-1 may be configured with a subinterface that will support a PVC to router 120-10-1 and a different subinterface that will support PVCs to routers 120-20-1 and 120-20-2.

In endpoint devices 120-10-1, 120-20-1, 120-20-2, 120-30-1 that support subinterfaces, the configuration information for each PVC must be properly assigned to the proper main interface or subinterface, a time consuming and error-prone task. Errors made can cause communication using the PVC to be impossible or unreliable.

There exists a need for a system and method that can reduce the communication and configuration steps required to configure a PVC and associate it with the proper main interface or subinterface in the endpoint devices, and to ensure that the endpoint devices are properly configured to match the parameters set up in the ATM network.

SUMMARY OF INVENTION

After the network administrator enters the configuration information into the devices in the ATM network, the endpoint devices use conventional, standard, ATM protocols to request a device in the ATM network to provide some or all of the configuration information that is stored in this ATM-network device. The configuration information for some or all PVCs configured is received from the device in the ATM network, and may be stored and used as configuration information by the endpoint device. In this manner, the configuration information received does not have to be manually entered, and is not subject to mismatch between the ATM network and the endpoint device. If the network administrator makes a change to the configuration information for a PVC in a network device, the device notifies any endpoint devices to which it is connected of the existence of the change. The endpoint device can then request the configuration information for that PVC, and update the configuration information stored in the endpoint device, allowing the change to be implemented by the endpoint device at almost the same time the change is implemented by the network device.

Certain identifiers of the PVC are received from the ATM network device in response to the request made by the endpoint device. One of the identifiers of one or more PVCs may be assigned by the network manager so that it also identifies the subnetwork on the endpoint device to which it is intended to relate. One or more subnetworks may be defined on the endpoint device, with each subnetwork defined using the identifier of the PVC over which the endpoint device will communicate. When the endpoint device requests the configuration information as described above, it receives the identifier of the PVC corresponding to the subnetwork. The endpoint device uses the PVC identifier to associate with the subnetwork the configuration information received for that PVC, avoiding the need for a person to manually associate the configuration information with the proper subnetwork, thereby avoiding errors and saving time.

DETAILED DESCRIPTION OF A PREFERRED EMBODIMENT

The present invention may be implemented as computer software in an endpoint device. An endpoint device may be implemented as a conventional computer system.

Figure 1B:
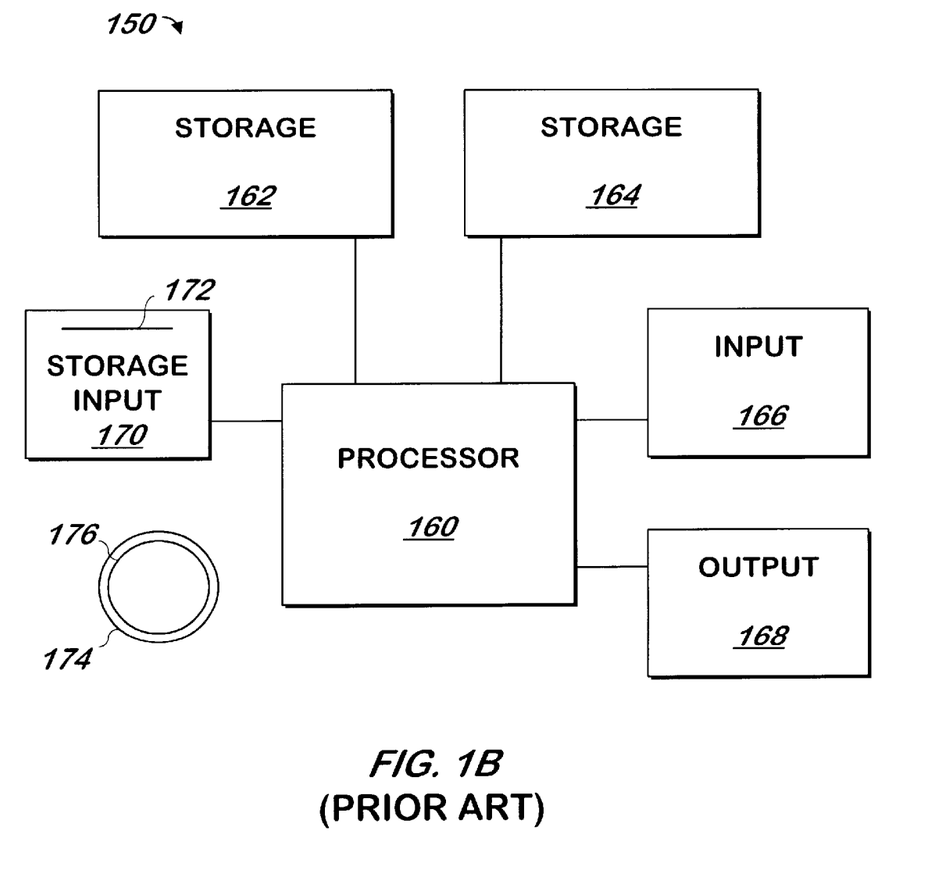
FIG. 1B is a block schematic diagram of a conventional computer system.

Referring now to FIG. 1B, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other non-volatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

Figure 2A:
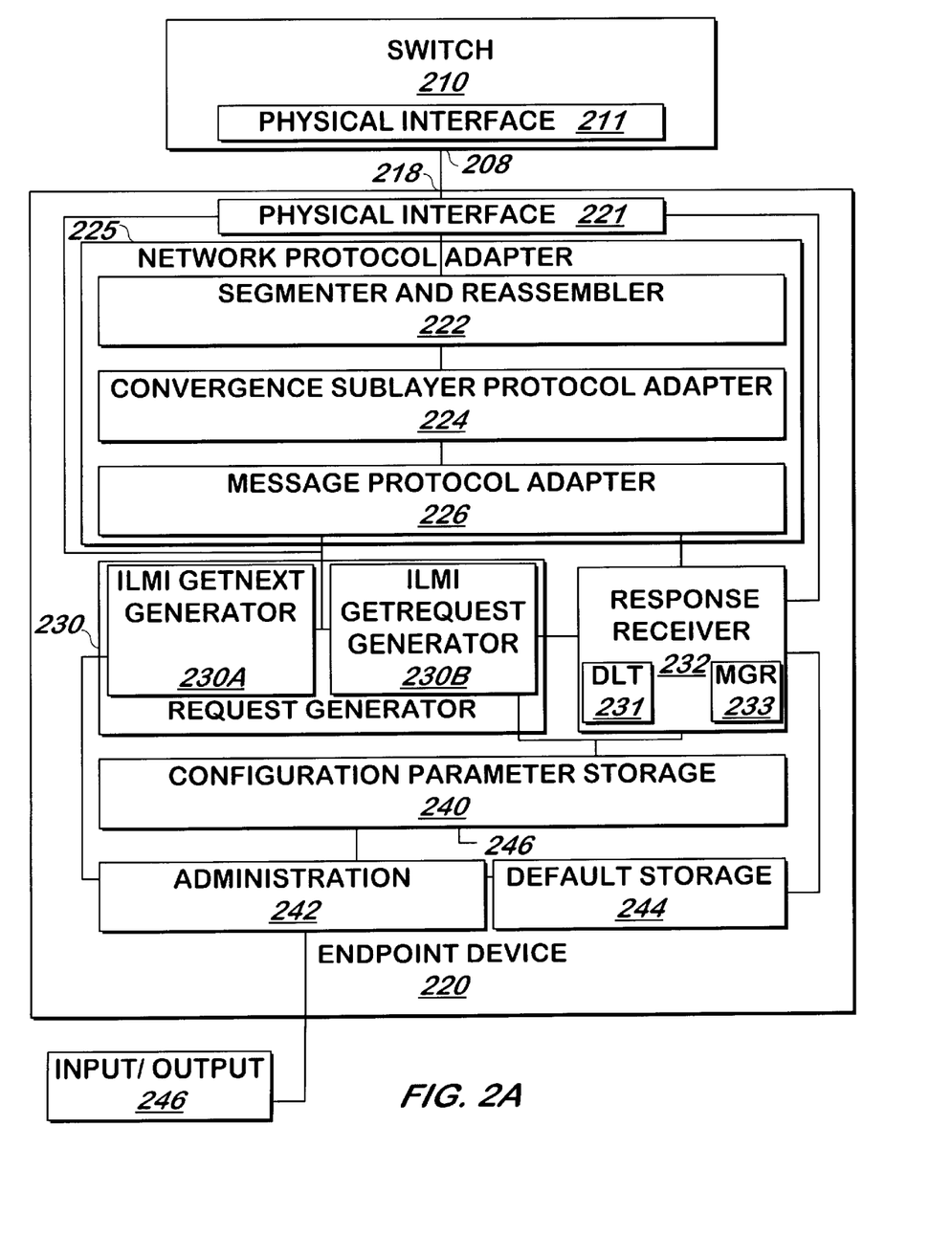
FIG. 2A is a block schematic diagram of an apparatus for retrieving and storing configuration information from an ATM network switch according to one embodiment of the present invention.

Referring now to FIG. 2A an apparatus for obtaining configuration information according to one embodiment of the present invention is shown. The configuration information is stored in an ATM switch 210 by an ATM network manager using conventional ATM network configuration of one or more PVCs or any other means of transmission and/or storage of the configuration information. The ATM switch 210 supports the integrated local management interface known as ILMI developed by the ATM Forum in one embodiment, although other interfaces that can provide configuration information may be used. ILMI, sometimes known as the Interim Local Management Interface, is an interface specification developed by the ATM Forum to manage ATM networks. The specification for ILMI is available at the website of the ATM Forum, www.atmforum.com. ILMI uses a protocol known as SNMP, although other protocols may be used. SNMP is described in Hein & Griffiths, *SNMP Versions* 1 & 2 (1995 International Thompson Computer Press ISBN 1-850-32139-6) or RFC 1157.

The switch 210 contains an ILMI MIB, a database of information it maintains. The ILMI MIB contains various tables, including an AtmfVccEntry table that contains certain configuration information. The AtmfVccEntry Table is described in section 8.4 of version 4.0 of the ILMI specification.

Figure 2B:
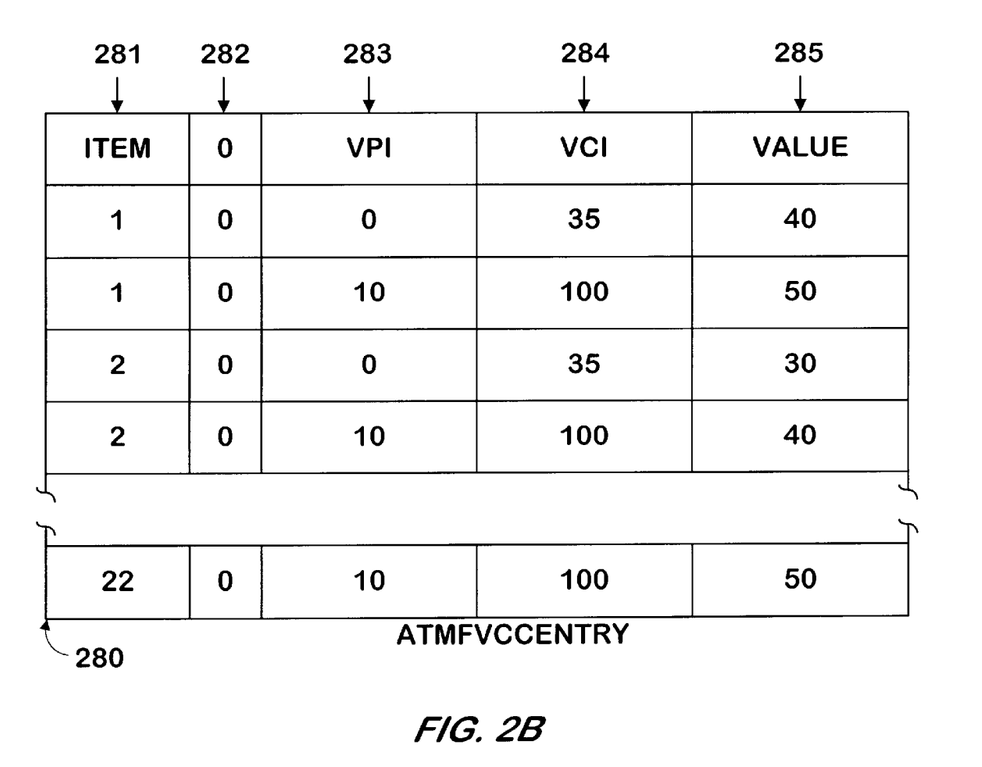
FIG. 2B is a block diagram illustrating the AtmfVccEntry Table of the ILMI MIB.

Referring now to FIG. 2B, an AtmfVccEntry table 280 is shown according to one embodiment of the present invention. The AtmfVccEntry table 280 contains the values 285 of 22 configuration parameters for each of the PVCs defined to the switch, for example by the network manager. Each configuration parameter has its own item number to identify the parameter. In the table 280 shown in FIG. 2B, there are two PVCs defined. Two numbers, a VPI number and a VCI number, together uniquely identify each PVC segment, and these numbers 283, 284 are assigned by the network manager and stored in the table 280. The values 285 of the configuration parameters for each item are also stored in the table 280.

In one embodiment, the table logically is arranged in rows, with each row containing an item number 281, a zero 282, a VPI value 283 for the row, a VCI value 284 for the row, and the value 285 of the configuration parameter corresponding to that item number for that VPI and VCI. In one embodiment, the rows are sorted by item number, then VPI, and then VPC, in ascending order. The table 280 need not physically be stored as shown in FIG. 2B; however, the organization of FIG. 2B may be useful as an aid to understanding.

To obtain information from the ILMI MIB AtmfVccEntry table 280 in a receiving device, either of two ILMI commands may be used by a requester. If the item number, VPI and VCI for the information desired are known, the sender sends to the receiving device an SNMP "getrequest" command. The getrequest command contains a parameter containing the identifier of the table (usually a string of digits separated by periods, like 132.34.56.3), the item number, a constant zero, the VPI and VCI. The receiving device returns the parameter that was sent to it as part of the request, and the corresponding value of the requested configuration parameter.

If all values in the table are desired or individual VPI and VCI values are not known, an SNMP "getnext" command sent from the requesting device to the receiving device along with a parameter having the same format as the parameter to the getrequest command. The values of the item, VPI and VCI in the parameter of the initial request are zero and the identifier of the table is returned by the receiving device with the first row of the table 280. The table identifier, item number, constant value of zero, VPI and VCI from the first row of the table 280 is then used as a parameter to a second getnext command to obtain the second row of the table. The table identifier, item number, constant value of zero, VPI and VCI from the second row is then used as a parameter to a third getnext command to obtain the third row of the table, and so on. In this manner, all of the rows of the table 280 may be obtained. SNMP getnext and getrequest commands are described more fully in Hein & Griffiths, *SNMP Versions 1 & 2* (1995 International Thompson Computer Press ISBN 1-850-32139-6) or RFC 1157.

Referring now to FIG. 2A, the switch 210 is linked to one or more endpoint devices 220 via physical interfaces 211, 221 with input/outputs 208, 218. The physical interfaces 211, 221 provide the functions of the Physical Media Dependent and Transmission Convergence layers of the B-ISDN protocol model developed by the International Telecommunications Union. The physical interfaces 211, 221 may support any conventional local or wide area transmission technology including SDH/SONET, PDH or ADSL.

Physical interface 221 detects a connection with a switch using conventional connection detection techniques such as watchdog timers or carrier detection and generates an interrupt, sets a flag (not shown) or sends another type of status change message to indicate the presence or absence of a connection to the switch 210.

Request generator 230 receives, either directly or indirectly by periodic polling, the status message sent by the physical interface 221. Upon receipt of the message indicating the change in status from indicating a connection absent to a connection present, request generator 230 obtains any configuration information in the AtmfVccEntry table in the switch 210 as described below. In one embodiment, request generator 230 generates requests that comply with the ILMI specification version 4.0, although other versions of ILMI or other specifications may be used.

Referring now to FIGS. 2A and 2B, an overview of the apparatus of FIG. 2A is described. To obtain the configuration information in the ILMI MIB maintained by the switch 210 in response to a status change message received from physical interface 221, the request generator 230 in the endpoint device 220 generates the initial getnext command described above, and passes it to the network protocol adapter 225. The network protocol adapter 225 formats the command and passes it to the physical interface 221 for transmission to the switch 210 via physical interface 211. The switch 210 responds by sending via physical interfaces 211, 221 a message containing the identifier of the AtmfVccEntry table, appended to a string containing the values in the first row shown in table 280. Network protocol adapter 225 decodes the response and passes it to response receiver 232. Response receiver 232 uses the response reconstruct a row of the table 280, or information equivalent to the row of the table, by storing the string into configuration parameter storage 240, which may be all or a portion of any storage device, and passes the VPI, VCI and item of the response to request generator 230. Request generator 230 uses this information to build the next argument for the following getnext command. This process is repeated until all of the values from the AtmfVccEntry table have been retrieved from the switch 210 and are stored in configuration parameter storage 240.

Referring now to FIG. 2A the endpoint device 220 will be described in more detail. Request generator 230 contains an ILMI getnext generator 230A and an ILMI getrequest generator 230B used as described below. ILMI getnext. generator 230A generates getnext commands, and ILMI getrequest generator 230B generates getrequest commands described above.

To obtain the values of the configuration information in the AtmfVccEntry table from the switch 210, ILMI getnext generator 230A generates the sequence of SNMP getnext commands described above. The sequence of commands generated by the ILMI getnext generator 230A is any sequence of commands that, when adapted by network protocol adapter 225, will cause the switch 210, or other device to which the endpoint device 220 is attached, to provide some or all of the configuration information for one or more PVCs.

If the requests generated by the request generator 230 are not in the SNMP protocol, message protocol adapter 226 adapts the command generated into the proper SNMP protocol. In another embodiment, all requests generated by request generator 230 are in the SNMP protocol, and the functionality of message protocol adapter 226 described above is part of the request generator 230 instead of the network protocol adapter 225.

Each getnext command is passed from the message protocol adapter 226 to the convergence sublayer protocol adapter 224 which adapts the command in the SNMP protocol into the conventional AAL5 protocol, as defined by the ITU, by adding a trailer. The command in the AAL5 protocol is passed to the segmenter and reassembler 222 which segments the command in the AAL5 protocol into one or more conventional ATM cells, and adds cell headers to each cell containing a VPI value of 0 and a VCI value of 16. These VPI and VCI assignments indicate the cell is an ILMI protocol command. An ATM cell is a 53-byte packet of information having the structure defined by the ATM Forum, although other structures may be used. Segmenter and reassembler 222 passes the ATM cells to the physical interface 221 for transmission to the switch 210 via physical interface 211.

The switch 210 reassembles the cells and strips the AAL5 protocol information and interprets the SNMP-formatted ILMI command. The switch 210 builds a response containing the identifier of the AtmfVccEntry table included in a string having the format, "AtmfVccEntry.item.0.vpi.vci", and a value corresponding to the row in the AtmfVccEntry table for which the request was intended as described above. The item field in the string describes the configuration parameter corresponding to the value returned, with atmfVccPortIndex corresponding to item 1, atmfVccVpi corresponding to item 2, and so on in the order shown in the definition of the sequence of the AtmfVccEntry in the ILMI protocol, version 4.0 (other versions of the ILMI protocol, or other protocols, may be used). The vpi field in the string returned corresponds to the lowest numbered VPI defined as a PVC on the switch 210, and the vci field of the string returned corresponds to the lowest numbered VCI for that VPI defined as a PVC on the switch 210. The value is the value of the configuration information corresponding to the item, vpi and vci.

The switch 210 then encodes this information using the SNMP protocol as a payload in an AAL5 message, segmented as one or more ATM cells with a cell header containing a VPI value of 0 and a VCI value of 16. The switch 210 sends these one or more cells back to the endpoint device 220 using the connection from which the request was received via physical interfaces 211, 221.

For each response received by the endpoint device 220, the physical interface 221 in the endpoint device 220 passes each cell to the segmenter and reassembler 222 which reassembles the payload of the one or more cells received with a VPI value of the cell header equal to 0 and VCI value of the cell header equal to 16 into an AAL5-formatted message, and passes the message to convergence sublayer protocol adapter 224. Convergence sublayer protocol adapter 224 performs error checking functions and strips off the AAL5 trailer to produce an SNMP message, which it passes to the message protocol adapter 226. The message protocol adapter 226 interprets the information using the SNMP protocol and the ILMI interface and passes the string and value in the response to response receiver 232. Response receiver 232 sends the string without the constant value of '0', to request generator 230 for use by ILMI getnext generator 230A in the next getnext command as described below.

The string returned is appended by ILMI getnext generator 230A to the definition of AtmfVccEntry and used as the argument to a next getnext command, which is built and sent to the switch 210 by ILMI getnext generator 230 as described above. If there are additional PVCs defined on the switch 210, the switch 210 will use the procedure described above to return a string containing the identifier of the AtmfVccEntry table and "item.0.vpi.vci" of the next row of the table.

ILMI getnext generator 230A continues using the string returned in the response to the prior getnext command to build the argument to the following getnext command and sends the command to the switch 210 as described above until all of the items in the AtmfVccEntry table of the ILMI MIB of the switch 210 are returned for all values of VPI and VCI. To detect when all rows of the AtmfVccEntry table have been received, ILMI getnext generator 230A stores the most recent item number requested. ILMI getnext generator 230A identifies that the entire table has been returned when the item number of the response received from the response receiver 232 is lower than the item number stored.

Response receiver 230A uses and stores the VPI and VCI returned in each of the responses having an item equal to '1' in order to build in configuration parameter storage 240 a table of all VPI and VCI values for which a PVC was configured on the switch 210. The configuration values corresponding to the items returned are stored in the table in configuration parameter storage 240 as well. The values are indexed by the item number in the string returned with the value in order to produce the entire AtmfVccEntry table for all items and all values of VPI and VCI for which a PVC was defined on the switch 210. Some of the values stored in configuration parameter storage 240 correspond to certain configuration information that would otherwise have to be manually entered into the endpoint device 220.

Other portions of the endpoint device not shown can retrieve the configuration parameters stored in configuration parameter storage 240 via address/data input/data output 246 for purposes of configuring the endpoint device.

In one embodiment, some of the values returned by the switch 210 may indicate that the corresponding parameter was not set on the switch 210, and some other configuration parameters used by the endpoint device 220 may not be available in the ILMI MIB of the switch 210. In such embodiment, response receiver 232 retrieves default values for the corresponding item from default storage 244, which in one embodiment, contains a table with two columns, an item number and a default value. In another embodiment, the default value is selected based on the values of the other items for that PVC or another PVC, and default storage 244 indicates how to select or compute the proper default value. The default value is then stored by response receiver 232 in configuration parameter storage 240 in place of, or in addition to, the values received from the switch 210.

In one embodiment, the information stored in default storage 244 is input via an input/output device 246 such as a conventional computer keyboard, mouse and display. Administration 242 stores predefined default values and can use input/output 246 to prompt the user for substitute default values or instructions and stores the corresponding response in default storage 244.

In one embodiment, an alternate manner of retrieving the entire table is presented. A combination of the ILMI getnext generator 230A and the ILMI getrequest generator 230B may be used to retrieve the entire table. ILMI getnext generator 230A is used as described above to retrieve all of the item 1 values and VPIs and VCIs. Once all the VPIs and VCIs are known, the item returned by the switch will be 2. ILMI getrequest generator 230B receives from response receiver 232 the VCIs and VPIs defined in the switch 210. ILMI getrequest generator 230B generates getrequest commands only for the VPIs, VCIs and items needed by the endpoint device 220 to configure the PVCs. For example, if some of the item values are not required to configure the endpoint device 220, only the items necessary are requested, reducing the traffic between the endpoint device 220 and the switch 210.

In another embodiment, a user may elect to define, using input/output 246 via administration 242 one or more PVCs without regard to the information in the switch, and administration 242 stores the definition of each such PVC in configuration parameter storage and marks them as static PVCs. The items for PVCs so defined as static may be skipped using getrequests: in one embodiment, response receiver 232 detects from configuration parameter storage 240 the defined PVC and will not send to ILMI getrequest generator 230B the VPI and VCI of such PVCs. In another embodiment, ILMI getrequest generator 230B performs the detection and omits the corresponding getrequest commands. Requests for items may also be similarly skipped because the items are not needed by the endpoint device 220, or not available on the switch 220. ILMI getrequest generator 230A stores the number of such items and omits requests for them, or response receiver 232 directs ILMI getrequest generator 230B not to produce them based on its own stored set of items to be omitted, or a prior response.

In one embodiment, if the switch 210 updates the information in the ILMI MIB, it builds and sends an ILMI trap to the endpoint device 246 via the physical interfaces 211, 221. An ILMI trap is a status message used to report certain events. In one embodiment, the trap is sent as an SNMP message using one or more ATM cells in the AAL5 protocol with a VPI value of 0 and VCI value of 16. Segmenter and reassembler 222 assembles the cells into an AAL5 message with the SNMP message as the payload, and passes the AAL5 message to the convergence layer protocol adapter 224, which strips away the AAL5 trailer. The resulting SNMP message is sent to the message protocol adapter 226, which passes the trap to response receiver 232.

An ILMI trap does not contain the value or values changed, but contains the VPI and VCI for which the values of one or more parameters have changed. It is the responsibility of the device that receives the trap to request the configuration values for the VPI and VCI.

Response receiver passes the VPI and VCI of the trap to ILMI getrequest generator 230B so that the new information related to the PVC having the VPI and VCI in the trap may be retrieved. ILMI getrequest generator 230B generates and sends to the switch 210 a series of getrequest commands using the argument "atmfVccEntry.ITEM.0.VPI.VCI", where AtmfVccEntry is equal to the identifier of the AtmfVccEntry table, VPI and VCI are the VPI and VCI contained in the trap, and item is the number 1 in the first command, 2 in the second command, and so on until 22 such getrequest commands are sent. A getrequest command transmitted by the ILMI getrequest receiver 230B is any command that causes the message protocol adapter 226 to generate an SNMP getnext command.

ILMI getrequest generator sends the series of getrequest commands to the message protocol adapter 226 which encodes the command into an SNMP message as described above, and sends the message to the convergence sublayer protocol adapter 224, which adds the trailer to encode the message as an AAL5 message, and sends it to segmenter and reassembler 222 for segmenting into one or more ATM cells. The segmenter and reasssembler 222 sends the one or more ATM cells to the physical interface 221 for transmission to the switch 210 via physical interface 211.

Each getrequest command causes the switch 210 to return the specified item in the AtmfVccEntry Table for the VPI and VCI specified. The use of getrequest commands avoids retrieving the entire table which can otherwise be required using the series of getnext commands described above. However, in an alternate embodiment, the entire table is retrieved in response to a trap by ILMI getnext generator 230A as described above.

In one embodiment, any parameter information retrieved from the switch 210 as described above is marked by response receiver 232 as having been obtained from the switch as it is stored in the configuration parameter storage 240. If communication between the switch 210 and the endpoint device 220 is terminated, for example by disconnecting the cable between the physical interfaces 211, 221, physical interface 221 detects the termination using conventional watchdog timer or carrier-detect-like techniques and sends a message to response receiver 232. Deleter 231 in response receiver 232 deletes the parameter information from the configuration parameter storage 240 that had been obtained from the switch 210 as described above. The deletion will prevent the information in the configuration parameter storage 240 from becoming out of synchronization with the corresponding information in the switch 210, which can happen for example if the switch 210 sends a trap while the connection is disabled. Instead, the information is deleted from the configuration parameter storage 240, but will be retrieved again as described above when the connection from switch 210 to the endpoint device 220 is reestablished.

In one embodiment, the manager of the endpoint device 220 uses input/output 246 and administration 242 to define one or more subinterfaces, including assigning the subinterface a number. For the main interface and each of the subinterfaces, administration 242 stores the subinterface number in configuration parameter storage 240 and reserves an area of configuration parameter storage 240 for storage of the parameters of one or more PVCs associated with that subinterface.

When the PVC configuration information is retrieved from the switch 210 as described above, interface information manager 233 in response receiver 232 directs the configuration information received to the proper portion of the configuration parameter storage 240. The interface information manager 233 uses the VPI of each PVC as described below and the subinterface numbers stored in configuration parameter storage 240 to identify whether the PVC should be associated with a subinterface, and, if so, the specific subinterface with which the PVC is to be associated. Interface information manager 233 associates the PVC and corresponding configuration information with any subinterface it identifies, or, if no subinterface corresponds to the PVC, associates the PVC and corresponding configuration information with the main interface. The association is made by storing the configuration parameters in the area in configuration parameter storage 240 reserved for the subinterface or main interface configuration parameters.

Thus, the manager of the endpoint device can instruct the network manager to assign each PVC in the switch 210 that is to be associated with a subinterface to have a VPI equal to the subinterface number defined on the endpoint device 220 as described above. Using the VPI of the PVC, interface information manager 233 will direct the configuration information to the proper area of the configuration parameter storage 240 so that the configuration information for all PVCs having a VPI equal to n will be stored in the area of configuration parameter storage 240 defined for subinterface n.

Figure 3:
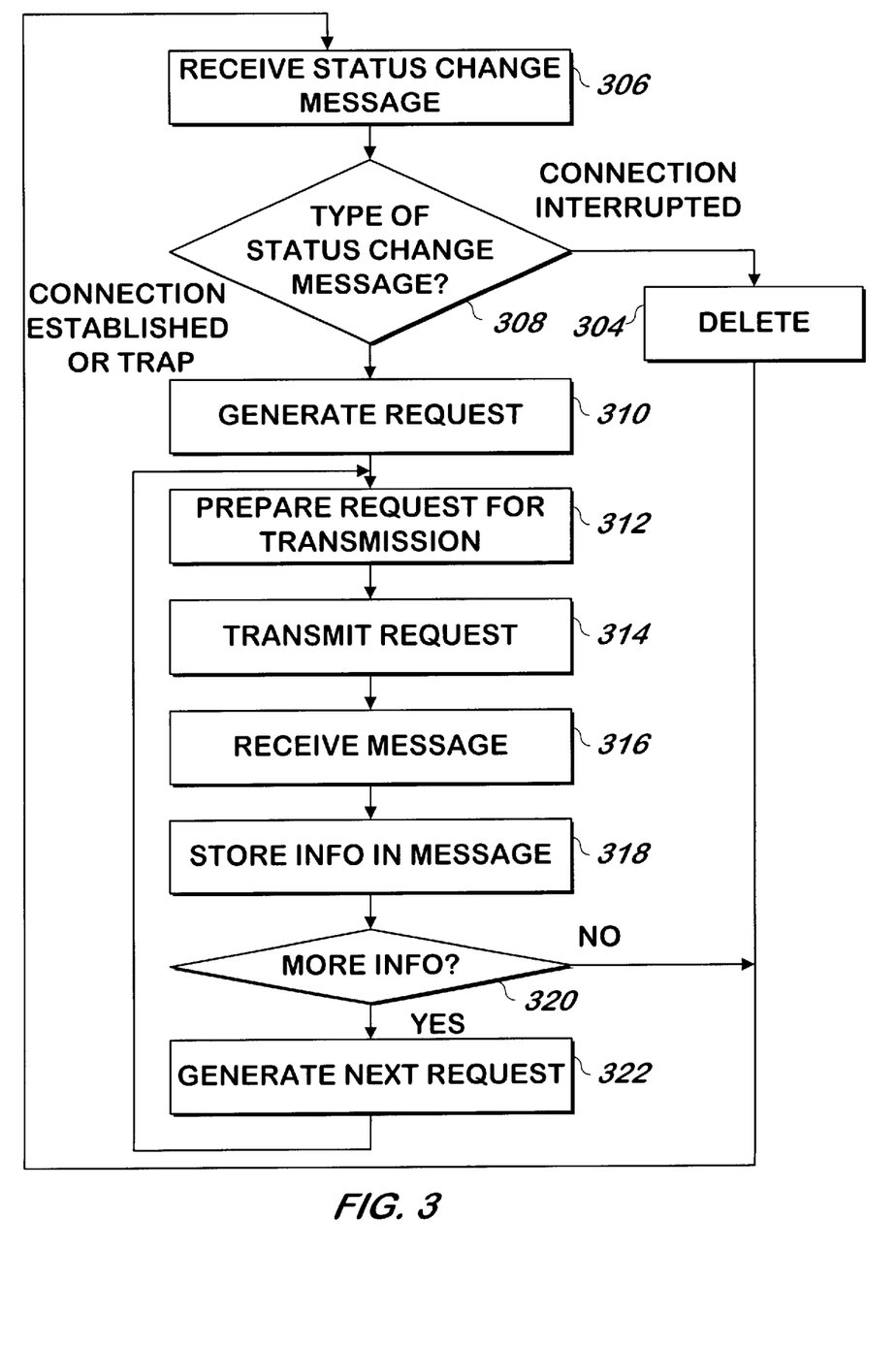
FIG. 3 is a flowchart illustrating a method of retrieving and storing configuration information according to one embodiment of the present invention.

Referring now to FIG. 3, a method of obtaining configuration information from a network device such as a switch is shown according to one embodiment of the present invention. A status change message is received 306 and may either be a message indicating that a connection has been established, a trap message, or a message indicating that a connection has been terminated. If the message indicates that a connection has been established or the message is a trap message 308, the method continues at step 310.

A request message is generated 310 as described above. In one embodiment, the request message that is generated is an ILMI getnext message in the SNMP version 1 protocol. In another embodiment, the message is an ILMI getnext message in the SNMP version 1 protocol if the message received in step 306 was a message indicating a connection was established, and an ILMI getrequest message in the SNMP version 1 protocol if the message received in step 306 was an trap message in the SNMP version 1 protocol as described above.

Figure 4:
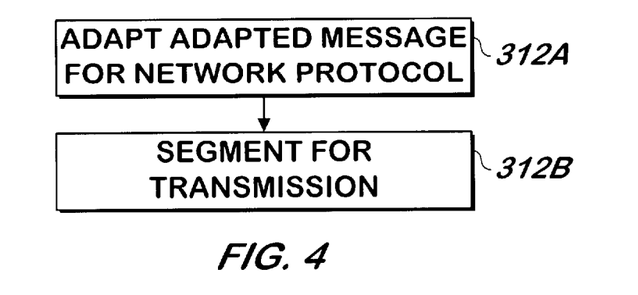
FIG. 4 is a flowchart illustrating a method of preparing a request for transmission according to one embodiment of the present invention.

The message generated in step 310 is prepared for transmission 312. Referring momentarily to FIGS. 3 and 4, in one embodiment, step 312 is accomplished by adapting 312A the message into a network-protocol, such as AAL5 described above, and then segmenting the message into one or more segments such as frames or ATM cells using the conventional ATM cell format described above.

Figure 5:
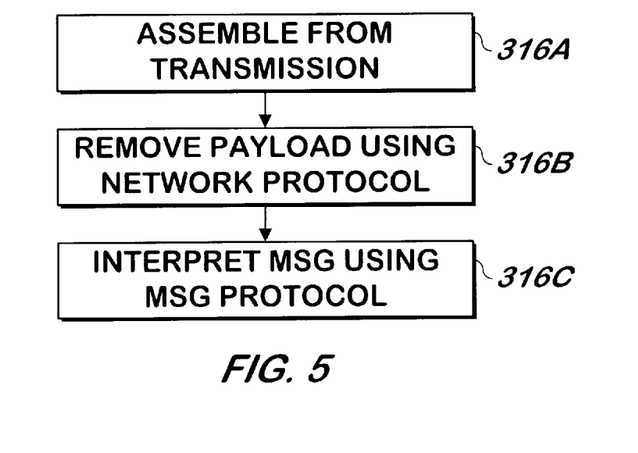
FIG. 5 is a flowchart illustrating a method of receiving a message according to one embodiment of the present invention.

Referring again to FIG. 3, the message prepared in step 312 is transmitted 314. A message, such as a response to the message transmitted in step 314 is received 316. Referring momentarily to FIGS. 3 and 5, the receiving step 316 is accomplished in one embodiment by assembling 316 any segments such as ATM cells in the conventional ATM cell format described above to produce a message in a network protocol such as AAL5, described above. The payload is removed from the message 316B to produce a message in a message protocol such as SNMP, and this message is interpreted 316C using ILMI to produce a string and value as described above.

Figure 6:
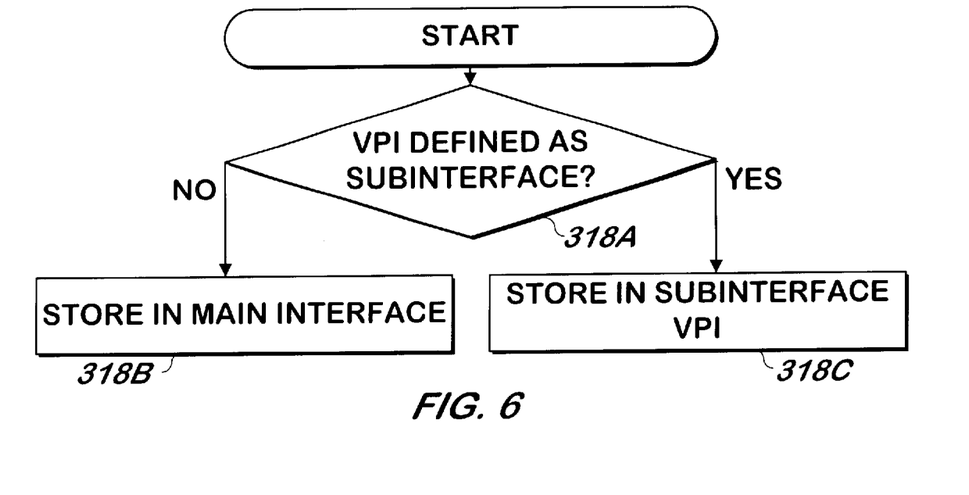
FIG. 6 is a flowchart illustrating a method of storing information from a message according to one embodiment of the present invention.

Referring again to FIG. 3, the information such as the string and the value described above and received in step 316 are stored 318. Referring momentarily to FIGS. 3 and 6, the storage step 318 is implemented as follows in one embodiment. The VPI in the string of the message is compared with the subinterfaces defined 318A. If the VPI of the message matches the interface number defined, the information in the message is stored 318C associated with that subinterface, and otherwise it is stored 318B associated with the main interface, which is the interface over which the message was received in one embodiment. In one embodiment, the association is accomplished by storing the information in a particular location reserved for information related to a particular subinterface or the main interface. In another embodiment, the association is accomplished by storing the information with a reference to the subinterface number.

Referring again to FIG. 3, if more information is available and desired 320, another request is generated 322. If an ILMI getrequest message was generated in step 310, more information is available for a VPC if the all of the items desired for the VPC have not been requested and received. If an ILMI getnext message was generated in step 310, more information is available until the item number received in the message in step 316 is lower than the item number in the request transmitted 314 for which the message received in step 316 is a response.

The next request generated is the same type, ILMI getnext or ILMI getrequest, as was generated in the prior request generated in step 310 in one embodiment, with an argument containing a different item number in the case of an ILMI getrequest, or using the string in the message received in step 316 in the case of an ILMI getnext.

In another embodiment, the next request generated is an ILMI getnext, and the VPC and VCI numbers returned in the messages received in step 316 are stored until the message received in step 316 contains an item number equal to 2, after which, getrequests are used using some or all of the VPI and VCI numbers stored, and each of the available item numbers 2–22 for each VPI and VPC, as described above.

In one embodiment, the information stored in step 318 is stored in a manner that allows it to be identified as having been requested, such as by setting a bit. If the status change message received in step 306 does not indicate that a connection was established or is not a trap, the status change message is an indicator that a connection has been interrupted. The information marked as being received in step 318 is deleted 304 in response to the status change message received in step 306 indicating the connection has been interrupted as described above. In one embodiment, other information such as configuration information associated with the information deleted is also deleted. For example, configuration information calculated or manually entered for the same VPC as that for which configuration information was earlier stored in step 318 may be deleted in addition to the information stored in step 318.

What is claimed is:

1. An apparatus for retrieving Permanent Virtual Channel (PVC) configuration information from a network device coupled to the apparatus, wherein the PVC configuration information specifies one or more PVCs defined for the network device, the apparatus comprising:

a PVC configuration parameter storage having a first input for receiving the PVC configuration information, the PVC configuration parameter storage for storing at least a portion of said PVC configuration information and providing a portion of said PVC configuration information at an output;

a request generator for generating and providing to an output at least one request for PVC configuration information for at least one logical interface, wherein each PVC is uniquely identified by a Virtual Path Identifier (VPI) and a Virtual Channel Identifier (VCI), the request generator being configured to:

if the VPI and VCI for a particular PVC are known, generate an ILMI getrequest command that includes the known VPI and VCI for the particular PVC, and if the VPI and VCI for a particular PVC are not known, generate an ILMI getnext command that includes a specified VPI and a specified VCI that indicate that the VPI and VCI for a particular PVC are not known;

a network protocol adapter having an input coupled to the request generator output for receiving the at least one request for PVC configuration information and providing at an input/output logically configured into the at least one logical interface and coupled to the network device at least one message responsive to the at least one request for PVC configuration information, and for receiving at the first input/output at least one message from the network device and generating and providing at an output, on the network protocol adaptor, at least one message comprising the PVC configuration information responsive to at least one of the messages from the network device received at the network protocol adapter input/output;

a response receiver having
first input coupled to the network protocol adapter output for receiving the PVC configuration information from the network protocol, adaptor;

a first output coupled to the PVC configuration parameter storage input;

a second output coupled to the ILMI request generator, second input operatively coupled to receive an indicator responsive to an interruption in transmission between the apparatus and the network device;

a deleter having an input coupled to the second input of the response receiver and an output coupled to the first output of the response receiver;

wherein the response receiver is configured to provide to the first output of the response receiver at least a portion of the PVC configuration information received at the response receiver first input in response to an identifier contained in the message received at the response receiver first input from the network protocol adaptor;

wherein the response receiver is further configured to extract VPIs and VCIs from the PVC configuration information and provide the VPIs and VCIs to the request generator to be used by the request generator to generate subsequent ILMI requests;

wherein the response receiver is further configured to generate identification data that indicates that the at least a portion of the PVC configuration information was received from the network device; and wherein the deleter is configured to cause, based upon the identification data and receipt of the indicator at the input, of the deleter, the at least a portion of the PVC configuration information to be selectively deleted from the PVC configuration parameter storage.

2. The apparatus of claim 1 wherein the network protocol adapter comprises a segmenter and reassembler having a first input/output coupled to the input of the network protocol adapter for receiving at least one of the requests for PVC configuration information and to the output of the network protocol adapter, the segmenter and reassembler for:

generating and providing at second input/output coupled to the network protocol adapter input/output at least one ATM cell responsive to at least one of the requests for PVC configuration information received at the segmenter and reassembler first input/output; and receiving at the second input/output at least one of the messages received from the network device and providing at the first input/output coupled to the network protocol adapter output at least one message responsive to at least one of said messages received from the network device.

3. The apparatus of claim 2, wherein the network protocol adapter additionally comprises a message protocol adapter for:

receiving at an input coupled to the request generator output at least one of the requests for PVC configuration information from the request generator and providing at first input/output coupled to the segmenter and reassembler first input/output at least one SNMP command responsive to at least one of said requests for PVC configuration information; and receiving at second input/output coupled to the segmenter and reassembler second input/output at least one message responsive to at least one of the messages received from the network device and providing at an output at least a portion of the PVC configuration information of said message.

4. The apparatus of claim 1, wherein the request generator has an input operatively couple to receive a status message and wherein the ILMI getnext command is responsive to the status message.

5. The apparatus of claim 1, wherein at least one set of the VPIs and VCIs received at the response receiver first input comprise an SNMP trap.

* * * * *

UNITED STATES PATENT AND TRADEMARK OFFICE
CERTIFICATE OF CORRECTION

PATENT NO. : 6,714,972 B1
DATED : March 30, 2004
INVENTOR(S) : Gabriel Lee et al.

It is certified that error appears in the above-identified patent and that said Letters Patent is hereby corrected as shown below:

Column 13,
Line 3, "the ILMI request" should read -- the request --;
Line 28, "input,of" should read -- input of --.

Signed and Sealed this

Tenth Day of August, 2004

JON W. DUDAS
*Acting Director of the United States Patent and Trademark Office*